United States Statutory Invention Registration [19]

[11] Reg. Number: H906

Baggett et al. [43] Published: Apr. 2, 1991

[54] WEDGE ASSEMBLY FOR ELECTRICAL TRANSFORMER COMPONENT SPACING

[75] Inventors: Franklin E. Baggett, Paducah; W. Franklin Cage, LaCenter, both of Ky.

[73] Assignee: The United States of America as represented by the United States Department of Energy, Washington, D.C.

[21] Appl. No.: 532,545

[22] Filed: Jun. 4, 1990

[51] Int. Cl.[5] ..... F16B 2/14

[52] U.S. Cl. ..... 403/409.1; 403/374; 403/358; 254/104

[58] Field of Search ..... 403/409.1, 374, 358; 254/104

[56] References Cited

U.S. PATENT DOCUMENTS 1,435,811 11/1922 Cuntala ..... 403/358
4,184,665 1/1980 Queen, Jr. ..... 254/104

FOREIGN PATENT DOCUMENTS 139027 2/1920 United Kingdom ..... 254/104
2126190 3/1984 United Kingdom ..... 254/104

*Primary Examiner*—Michael J. Carone
*Attorney, Agent, or Firm*—David E. Breeden; Stephen D. Hamel; William R. Moser

[57] ABSTRACT

A wedge assembly that is easily inserted between two surfaces to be supported thereby, and thereafter expanded to produce a selected spacing between those surfaces. This wedge assembly has two outer members that are substantially identical except that they are mirror images of each other. Oppositely directed faces of these of these outer members are substantially parallel for the purpose of contacting the surfaces to be separated. The outer faces of these outer members that are directed toward each other are tapered so as to contact a center member having complementary tapers on both faces. A washer member is provided to contact a common end of the outer members, and a bolt member penetrates this washer and is threadably received in a receptor of the center member. As the bolt member is threaded into the center member, the center member is drawn further into the gap between the outer members and thereby separates these outer members to contact the surfaces to be separated. In the preferred embodiment, the contacting surfaces of the outer member and the center member are provided with guide elements. The wedge assembly is described for use in separating the secondary windings from the laminations of an electrical power transformer.

12 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WEDGE ASSEMBLY FOR ELECTRICAL TRANSFORMER COMPONENT SPACING

This invention was made as a result of work under Contract No. DE-AC05-840R2 1400 between the U.S. Department of Energy and Martin Marietta Energy Systems, Inc.

DESCRIPTION

1. Field of Invention

It relates generally to an expandable wedge device for establishing a selected distance between two surfaces, and more particularly to an expandable wedge device useful for adjusting the spacing between components in electrical transformers such as the spacing between the secondary windings and the iron laminations of large-size multi-phase power transformers.

2. Background Art

A typical power transformer is shown in FIG. 1. In such transformers, it is desirable that the spacing between the secondary windings (item 12) and the iron laminations (item 14) be maintained at a constant distance and remain secure due to mechanical forces imposed on the transformer windings during electrical system transients. This is conventionally accomplished through the use of a plurality of spacers interposed between these components during the fabrication of the transformer. Typically, these spacers are wedges fabricated from a phenolic resin or similar high dielectric material. Vibrations within the transformer occasionally cause these spacers to become loose, cracked, or even lost from the transformer, so that periodic inspection of transformers is performed. When damaged or missing spacers are noted, replacement spacers are driven in proximity to that position. If only loose, the spacer is driven into position to re-establish the desired spacing. This driving of the spacers is typically accomplished using a hammer and a drive bar.

This prior art regarding the spacers and the method of re-tightening or replacement is relatively costly since there is a risk of damage to the transformer due to the proximity of the drive bar to the iron laminations and/or insulators on the transformer. Further, it is a time-consuming task which often results in a poor-appearing installation because the new edges of the wedges cannot be aligned with the existing wedge, and the wedges often break or splinter and thus have battered ends.

Accordingly, it is an object of the present invention to provide a replacement wedge for the electrical transformers that is easily positioned and tightened into position.

Another object of the present invention is to provide a replacement wedge for the electrical transformers to maintain spacing between the secondary windings and the iron laminations that does not require a driving force for installation.

A further object of the present invention is to provide a wedge assembly to establish a selected spacing between two opposing surfaces, with the wedge assembly being easily installed between those surfaces and then expanded to contact the surfaces and establish the selected spacing.

It is another object of the present invention to provide a wedge assembly that is inexpensive, requires little effort for installation, and provides an acceptable appearance.

There and other objects of the present invention will become apparent upon a consideration of the drawings listed below, and a complete description thereof that follows.

SUMMARY OF INVENTION

In accordance with the present invention, there is provided a wedge assembly for establishing a selected spacing between two objects having substantially parallel surfaces. This assembly is easily inserted between these surfaces in a condition of reduced dimension, and then expanded to achieve the selected spacing. The assembly includes two substantially identical, but mirrored, components that provide oppositely disposed and substantially parallel faces to contact the surfaces of the objects. This is in contrast to the tapered surfaces of the prior art devices that required a driving force to insert them between the two surfaces to be separated. The facing surfaces of these two components are tapered, and a third component having tapered mating surfaces is positioned therebetween. This third component is provided with a threaded receptor, and a bolt member is threadbly received in this receptor. A washer carried by this bolt member bears against a common end of the first-named components whereby rotation of the bolt member causes the third component to be further drawn between the outer components causing them to be displaced farther from each other. This action brings the outer faces of the two components into contact with the surfaces of the objects to establish the selected spacing. In the preferred embodiment of the present invention, the mating surfaces of the outer components and the third component are provided with guide means to maintain alignment between the three components during assembly and during the wedging action of the device.

DETAILED DESCRIPTION OF THE INVENTION

Figure 1:
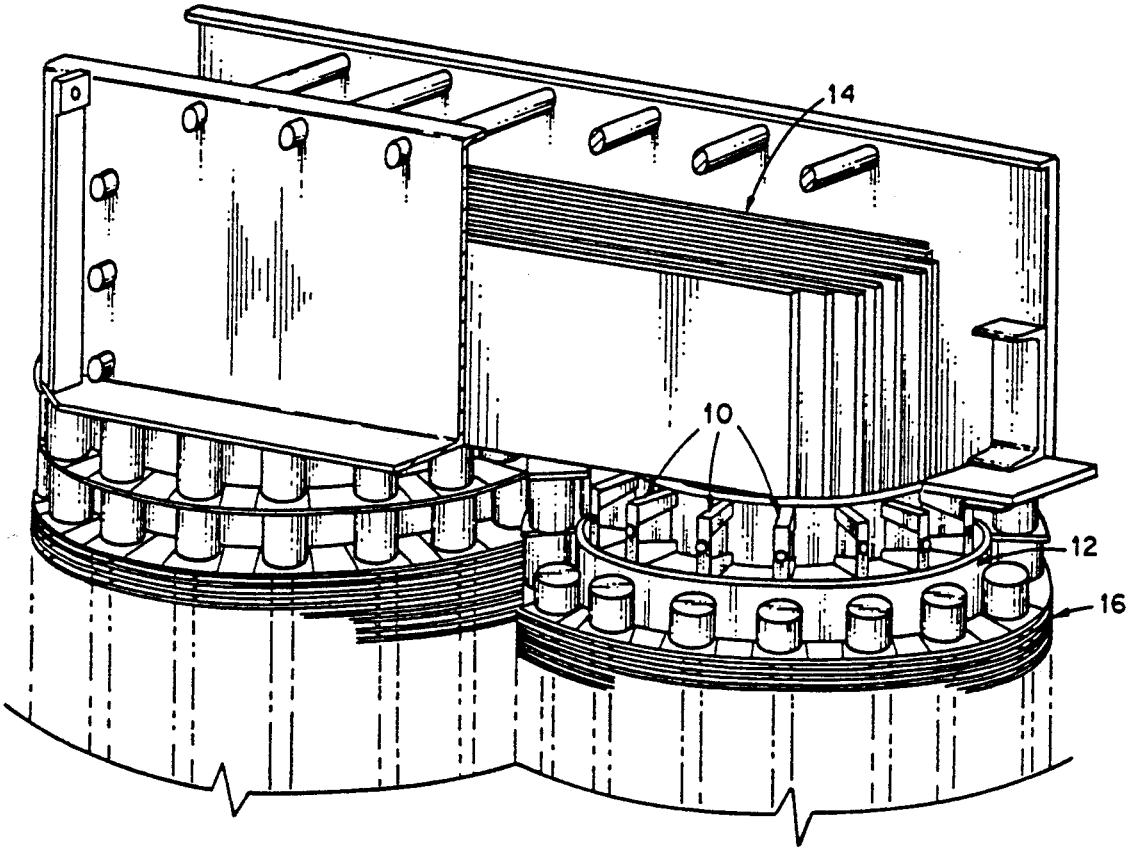
FIG. 1 is an isometric drawing of a typical power transformer, with a portion cut away, depicting the present invention in place therein.

A typical multi-phase power transformer is illustrated in FIG. 1 with a plurality of the present invention assemblies 10 inserted between the secondary windings 12 and the iron laminations 14 in order to establish and maintain a selected spacing therebetween. A portion of primary winding section 16 of the transformer in the drawing has been cut away to better show the position of the wedge assemblies as inserted between these components. The specific transformer illustrated is a three-phase Allis-Chalmers 7500/10,000 KVA transformer with a primary voltage of 13,800 volts and a secondary voltage of 2400 volts. Many other commercial power transformers have substantially the same physical construction where this secure spacing between components must be maintained. It can be seen that the adjustment bolt (see FIGS. 2 and 3) of the wedge assembly 10 is readily available for expanding the wedge assembly during initial installation as well as for adjustment of the spacing at subsequent times. However, if the varnish referred to hereinafter as a lubricant is used, no subsequent adjustment can be made.

Figure 2:
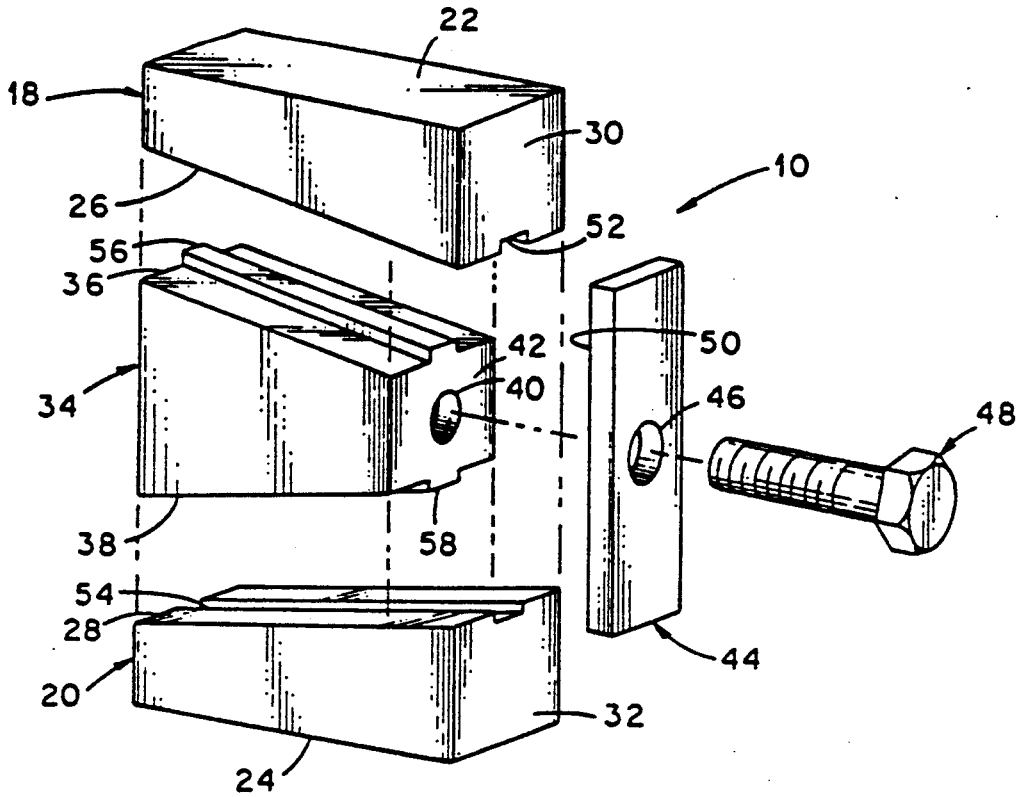
FIG. 2 is an exploded view of the components of the present invention.

The components of the wedge assembly 10 of the present invention are shown in the exploded view of FIG. 2. The outer components 18, 20 of the assembly are substantially alike except that they are mirror images of each other. These provide two oppositely-directed faces 22, 24 that are substantially parallel: these faces 22, 24 are to contact the surfaces of objects to be spaced apart (such as the secondary windings and the laminations depicted in FIG. 1). The faces 26, 28 on the opposite sides of the outer components 18, 20, respectively, are angular so as to diverge equally away from their respective ends 30, 32. The slope of these faces is typically 10–15 degrees. A generally trapezoidal central member 34 is interposed between the components 18, 20. This central member 34 has faces 36, 38 that have a complementary angle to the angle of the faces 26, 28 for purposes described hereinafter. Also, this central member 34 is provided with a threaded receptor 40 that enters the member from its end 42. The assembly is completed with a plate (or washer) 44 having an aperture 46 for accepting a threaded bolt member 48 for engagement with the receptor 40. This plate 44 is of sufficient size such that a back surface 50 thereof will contact the end surfaces 30, 32 of the members 18, 20, respectively.

In a preferred form of the assembly, the main wedge members are provided with guide means to align the members during assembly and during operation. Typical of the guide means that can be provided is illustrated in this FIG. 2. Each of the contacting faces of the members 18, 20 and 34 are provided with guide members in the form of slideways 52, 54 and slides 56, 58. Of course, other guide means will be known to those versed in the art. Further, the slideways and slides can have configurations other than the rectangular cross-sections as illustrated. In addition, the slideways can be located in the central member 34 with the slides being provided on the abutting surfaces of the members 18, 20. If desired, a type of lubricant can be applied to the sliding surfaces for ease in drawing the center member in between the outer members. A suitable lubricant (and sealant) is an air-drying varnish.

Figure 3:
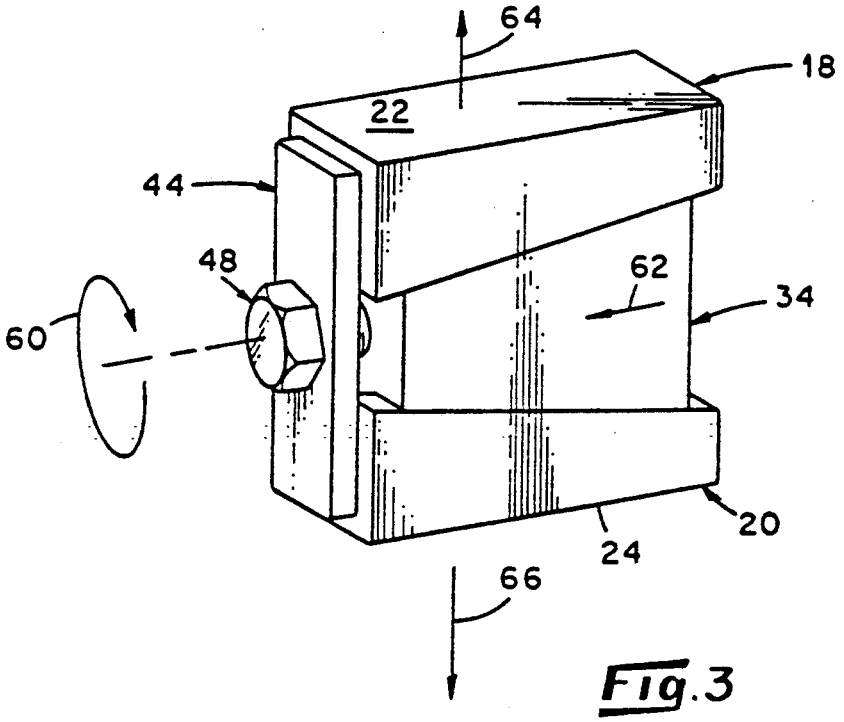
FIG. 3 is an isometric drawing of the wedge assembly of the present invention, with the components of FIG. 2 assembled.

The wedge assembly with all of the components engaged is illustrated in FIG. 3. As the bolt member 48 is rotated in a direction indicated by the arrow 60, the central member 34 is caused to move in a direction indicated by the arrow 62 (relative to the other members). This then causes the members 18, 20 to move in the directions indicated by arrows 64, 66 so that the dimension from surface 22 to surface 24 is increased to produce the desired wedging action. When a wedge assembly suitable for the above-cited transformer application is fully assembled, it is typically about 3.25 inches in height, about 3.25 inches deep, and about 1.25 inches in thickness. Of course, these dimensions are not critical to the invention.

Figure 4:
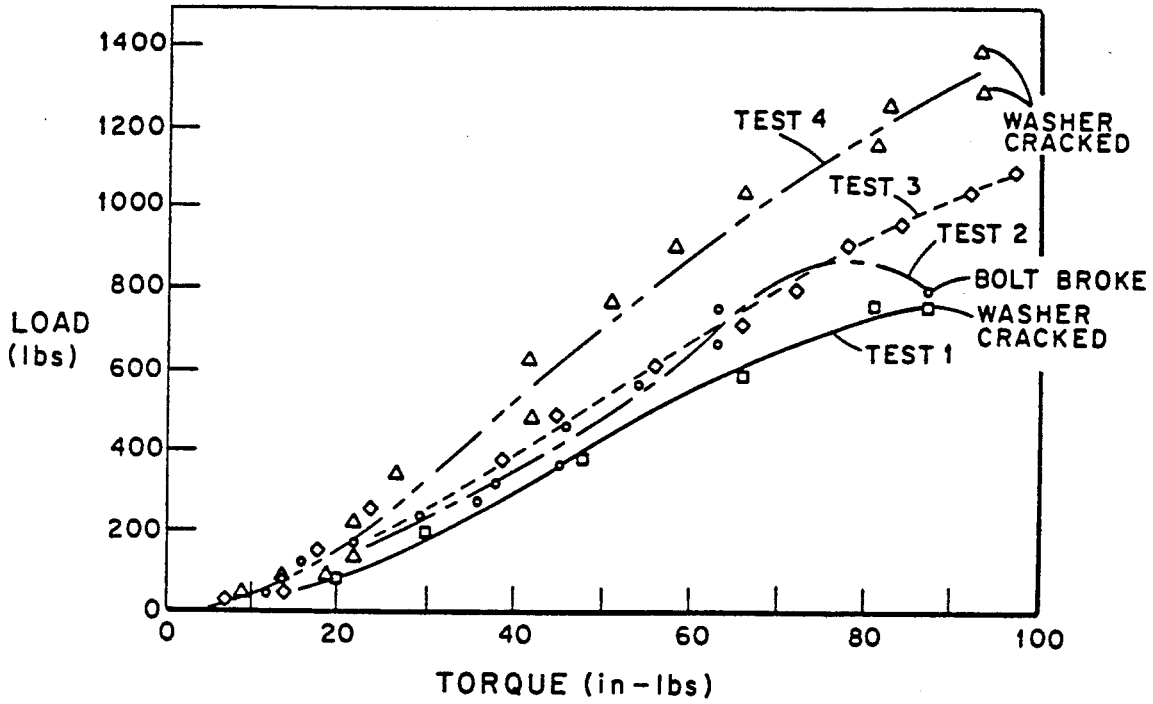
FIG. 4 is a graph illustrating test data performed to determine the strength of the wedge assemblies of the present invention when fabricated of phenolic resins and using a nylon bolt.

Typically, the outer members, the center member and the washer are fabricated from conventional phenolic resins (e.g., "UTR" plastic material) that are fully electrically insulative. The bolt member is typically fabricated from nylon. These materials have been shown to have sufficient strength for most applications of the present wedge assembly. For example, a wedge assembly of this type was subjected to various torque loads applied to the bolt member 48. The results are plotted in FIG. 4 where it can be seen that no failure was observed up to about 80 in-lbs, providing a loading generally above 800 pounds. For applications where additional strength is required, at least some of the components can be fabricated of a suitable stronger material, such as metal. Also, additional torque can be applied if acme threads are utilized on the bolt member 48 and receptor 40.

The wedge assembly of the present invention is very easily installed in transformers (and any application requiring the same conditions) without any risk of damaging components as experienced with the prior art driven wedges. In addition, these wedges provide an improved quality of installation and a more workmanlike appearance. This wedge assembly can be utilized in the original manufacture of electrical transformer, or can be used in "retrofit" applications to replace defective wedges of the prior art type. Since the faces in contact with the surfaces to be separated are substantially parallel, considerable holding force is present to minimize shifting or loosening. As will be understood, although the present wedge design is illustrated for a specific electrical transformer application, it will have other applications where any two surfaces are to be maintained at a selected spacing.

From the foregoing, it will be understood by persons skilled in the art that a wedge assembly has been provided that can be easily installed between two surfaces that are to be positioned at a selected separation distance. This wedge assembly can then be expanded in a direction to contact those surfaces so as to maintain that selected spacing. The wedge assembly components are fabricated from material that is appropriate with the load and with the particular environment of the installation.

Although the wedge assembly has been described with some details as to materials and size, these are given for illustration purposes only and not for the purpose of limiting the present invention. Rather, the invention is to be limited only by the appended claims and their equivalents when read together with the complete description of the invention.

We claim:

1. An adjustable wedge assembly device for establishing and maintaining a selected spacing between two opposing surfaces, which comprises:

a pair of spaced apart outer wedge members, each of said outer wedge members being substantially mirror images of each other, each one of said outer wedge members having a first face disposed in a direction opposite to the other outer wedge member so as to contact one of said opposing surfaces to be spaced, and a tapered second face disposed in a direction toward the other outer wedge member, each of said outer wedge members having a first end and a further end, said further ends of said outer wedge members diverging from each other relative to said first ends;

a center wedge member disposed between said outer wedge members, said center wedge member having oppositely disposed tapered edges slidably in contact with said second faces of said outer wedge members, said center wedge member having a first end and a further end, and being provided with a threaded receptor communicating with said first end of said center wedge member;

a washer member disposed against said first ends of said outer wedge members, said washer member being provided with an aperture; and a threaded bolt member disposed through said aperture of said washer member and threadably engaged with said threaded receptor of said center wedge member, said bolt member having a head disposed against said washer member whereby rotation of said bolt member causes said center wedge member to be moved in a direction toward said first ends of said outer wedge members whereby said center wedge member further separates said pair of outer wedge members to engage said first faces with said surfaces to be separated.

2. The wedge device of claim 1 wherein said second faces of said outer wedge members and said oppositely disposed edges of said center wedge member are provided with guide means for maintaining alignment of said center wedge member with said outer wedge members.

3. The wedge device of claim 2 wherein said guide means comprises complementary slideways and slides.

4. The wedge device of claim 3 wherein said slideways have a rectangular cross-section and said slides have a complementary rectangular cross-section.

5. The wedge device of claim 3 wherein said slideways are provided on said second faces of said outer wedge members and said slides are provided on said oppositely disposed edges of said center wedge member.

6. An adjustable wedge assembly device for establishing and maintaining a selected spacing between two opposing surfaces, which comprises:

a pair of spaced apart outer wedge members, each of said outer wedge members being substantially mirror images of each other, each one of said outer wedge members having a first face disposed in a direction opposite to the other outer wedge member so as to contact one of said opposing surfaces to be spaced, and a tapered second face disposed in a direction toward the other outer wedge member, each of said outer wedge members having a first end and a further end, said further ends of said outer wedge members diverging from each other relative to said first ends;

a center wedge member disposed between said outer wedge members, said center wedge member having oppositely disposed tapered edges slidably in contact with said second faces of said outer wedge members, said center wedge member having a first end and a further end, and being provided with a threaded receptor communicating with said first end of said center wedge member;

guide means disposed between said second faces of said outer wedge members and said oppositely directed edges of said center wedge member for maintaining alignment of said center wedge member with said outer wedge members;

a washer member disposed against said first ends of said outer wedge members, said washer member being provided with an aperture; and a threaded bolt member disposed through said aperture of said washer member and threadably engaged with said threaded receptor of said center wedge member, said bolt member having a head disposed against said washer member whereby rotation of said bolt member causes said center wedge member to be moved in a direction toward said first ends of said outer wedge members whereby said center wedge member further separates said pair of outer wedge members to engage said first faces with said surfaces to be separated.

7. The wedge device of claim 6 wherein said guide means comprises complementary slideways and slides.

8. The wedge device of claim 7 wherein said slideways have a rectangular cross-section and said slides have a complementary rectangular cross-section.

9. The wedge device of claim 7 wherein said slideways are provided on said second faces of said outer wedge members and said slides are provided on said oppositely disposed edges of said center wedge member.

10. An adjustable wedge assembly device for establishing and maintaining a selected spacing between secondary windings and iron laminations of a electrical power transformer, which comprises:

a pair of spaced apart outer wedge members, each of said outer wedge members being substantially mirror images of each other, each one of said outer wedge members having a first face disposed in a direction opposite to the other outer wedge member so as to contact one of said secondary winding and said iron laminations of said transformer to be spaced, and a tapered second face disposed in a direction toward the other outer wedge member, each of said outer wedge members having a first end and a further end, said second faces of said outer wedge members diverging from each other from said first ends toward said further ends;

a center wedge member disposed between said outer wedge members, said center wedge member having oppositely disposed tapered edges slidably in contact with said second faces of said outer wedge members, said center wedge member having a first end and a further end, and being provided with a threaded receptor communicating with a first end of said center wedge member;

guide means disposed between said second faces of said outer wedge members and said oppositely directed edges of said center wedge member for maintaining alignment of said center wedge member with said outer wedge members, said guide means comprising slideways and slides on said second faces and said oppositely directed edges, respectively;

a washer member disposed against said first ends of said outer wedge members, said washer member being provided with an aperture; and a threaded bolt member disposed through said aperture of said washer member and threadably engaged with said threaded receptor of said center wedge member, said bolt member having a head disposed against said washer member whereby rotation of said bolt member causes said center wedge member to be moved in a direction toward said first ends of said outer wedge members whereby said center wedge member further separates said pair of outer wedge members to engage said first faces with said secondary windings and said iron laminations to be separated.

11. The wedge device of claim 10 wherein said slideways have a rectangular cross-section and said slides have a complementary rectangular cross-section.

12. The wedge device of claim 10 wherein said guide means is provided with lubricant.

* * * * *